UNITED STATES PATENT OFFICE.

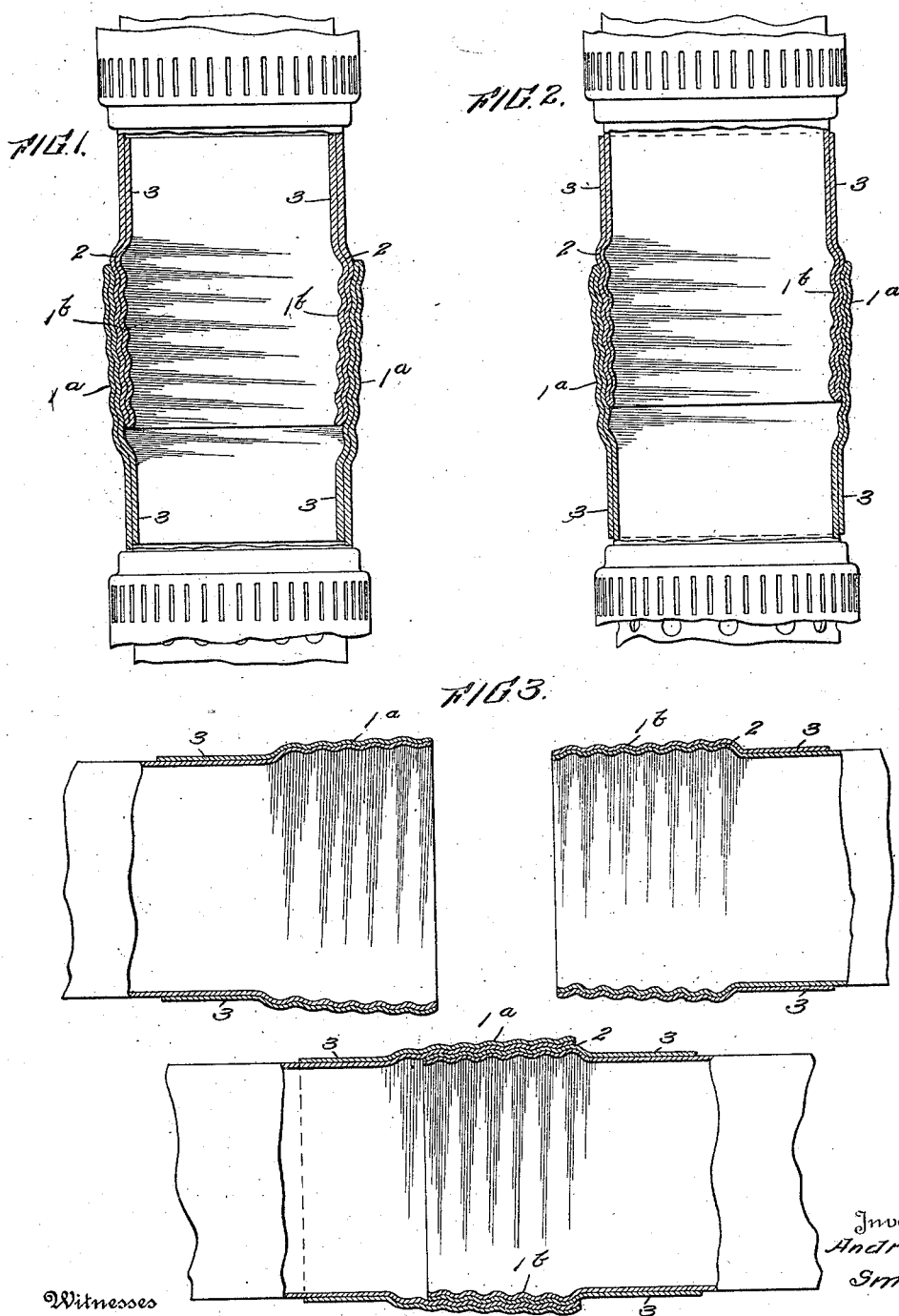

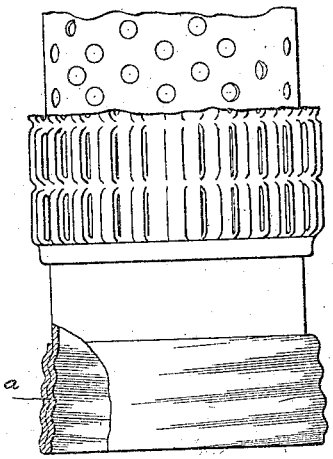
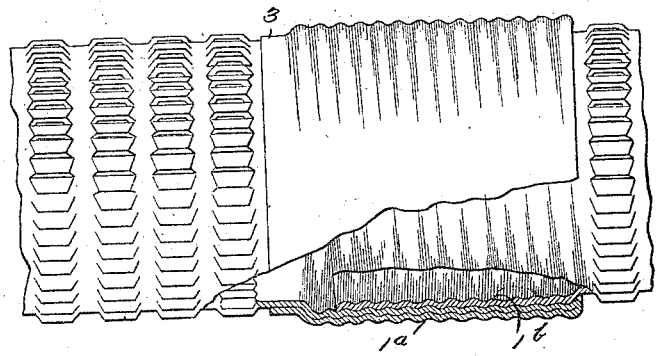
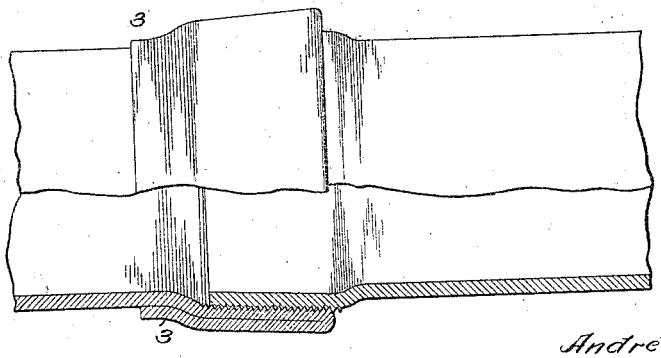

ANDREW SMITH, OF SAN MATEO, CALIFORNIA.

JOINT FOR METAL CASINGS.

1,296,016.

Specification of Letters Patent.

Patented Mar. 4, 1919.

Original application filed July 29, 1913, Serial No. 781,820. Divided and this application filed March 25, 1915. Serial No. 17,010.

*To all whom it may concern:*

Be it known that I, ANDREW SMITH, a citizen of the United States, residing at San Mateo, in the county of San Mateo and State of California, have invented certain new and useful Improvements in Joints for Metal Casings, of which the following is a specification.

This invention relates to sheet metal casings for use in conduits, culverts, drain tiles, well-strainers or curbings, etc., and more particularly to the construction of the joints by which the sections of the casing are connected, this case being a division of my prior Patent No. 1,165,137, dated December 21, 1915.

The common coupling most generally employed for uniting tubing consists of a socket screw-threaded on the interior, and a corresponding screw-thread formed on the ends of each section, the adjacent ends of the sections being then screwed into the coupling. When the tubing is used for casings for wells which frequently extend to a depth of several hundred feet it is necessary that the joint should be capable of resisting enormous strains and of sustaining great weight and pressure without stripping the threads. Again when the tubing is used for pipe-lines and similar purposes, where it is often subjected to severe lateral or bending strains, it has been found that the threaded joint is the weakest part of the conduit and the cause of most of the failures. For this reason the thickness of the metal walls has been increased in order to permit the cutting of deeper threads without a too great weakening of the metal at the joint. This increased thickness of the tubing adds materially to the weight and cost and the increased weight of the tubing increases the cost of shipment and adds also to the expense of handling the pipe at the place of installation. Furthermore it greatly increases the weight of metal that must be sustained when the tubing is used for well casings.

One object of my invention is to provide a coupling which will be as strong at the joint as the main body of the casing, or even stronger, to resist strains due to longitudinal tension or compression, and also lateral or bending strains. Another object is to reinforce the metal at the joint and also adjacent the joint so that the casing may be manipulated by tongs or other implements without injury. A further object is to provide a casing in which there is no contraction of the internal capacity or area through the joint or coupling portion. Other purposes of my invention will be apparent from the following detailed description.

In the accompanying drawings, Figures 1 and 2 are longitudinal sections showing portions of casing units provided with reinforced joints embodying my invention; Fig. 3 is a longitudinal section showing a modification of the joint shown in Fig. 2, with the ends of the casing sections separated; Fig. 4, shows the same with the ends of the sections screwed together; Fig. 5, is a fragmentary longitudinal view, partly in section, showing my reinforced joint or coupling applied to a duplex perforated casing or strainer, which forms the subject-matter of my aforesaid application; Fig. 6, is a fragmentary longitudinal view showing partly in section one form of my reinforced joint applied to a single-walled strainer casing; and Fig. 7, is a longitudinal view, partly in section of the meeting ends of pipe sections showing a modified form of my joint.

In order to provide a reinforcement of the metal at the joint, I fold back or return the metal upon itself while in the sheet a distance sufficient to cover the joint and the adjacent portion which receives the gripping tongs when the pipe or casing is being manipulated. The sheet is then shaped into tubular form and the meeting edges are welded to form a longitudinal seam, preferably by the oxyacetylene or by the electric arc welding processes. The pipe or casing may be formed with the reinforcement upon the inner side, as shown in Fig. 1, or upon the outer side as shown in Fig. 2, the latter being preferable in most cases.

After the casing units have been formed as above described, I roll spiral corrugations or threads in each end the required distance, at the same time, flaring one end into a bell-shape or mouth as at 1$^a$, to form the outer member and correspondingly tapering the other end as at 1$^b$, to form the inner member. By rolling the spiral corrugations or threads into the metal after it has been folded back upon itself, both layers of metal partake of the thread formation and every part of the threads or corrugations is fully reinforced. In order that the internal diameter of the tapered end shall not be less than that of the main portion, I force the metal outwardly at the base 2, or inner end of the tapered portion, a distance corresponding to the taper of the joints. There is, therefore, no contraction in the bore of the pipe or obstruction offered by the parts forming the joint.

The plain extended portions 3 reinforce those portions of the casing which are grasped by the tongs or clamps when the pipe is being manipulated, as for instance, when the sections or units are being screwed together and when a well casing is being lowered into a well. This extended reinforcement also adds rigidity to the end portions which serves as a protection during the rough handling of shipment. The conformation of the spiral corrugations or threads is insured by the double thickness of metal, every part of which is reinforced.

Instead of folding the metal back upon itself while in the sheet, I may slip an outer sleeve over a single tubular casing and weld the two together to form an integral reinforced structure and then roll the threads therein as shown in Figs. 3 and 4. In this manner I may use reinforcing members of different thicknesses to suit varying conditions to which the casing may be subjected.

In some cases I find it sufficient to reinforce only one end of the sections, thereby forming a joint having a triple thickness of metal instead of a quadruple thickness, as in the forms previously described. In this form, as illustrated in Fig. 6, I prefer to reinforce the outer or flared end as this must resist the outward pressure tending to stretch or rupture the metal as the pipe ends are screwed together; while the action upon the inner member is one of compression and it is well known that metal will offer greater resistance to compressions than to stretching or expansion. Under many conditions this reinforcement of the outer member only, giving a threefold wall in the joint is ample in strength to support and resist all the strains to which it may be subjected and with a large reserve or factor of safety.

While I prefer to taper one end and correspondingly flare the other end of the units or sections as previously described, I may in some cases dispense with the conical formation upon one end. That is, I may either taper one end and form the other end of a uniform diameter, or I may flare the end forming the outer member of the joint and make the other end of uniform diameter. In the first case, the tapered end stretches the outer member slightly, and in the other case, the outer member compresses the inner member into a slight taper, so that in both cases the inner and outer members conform to each other as the parts are screwed together.

In Fig. 7, I have shown a modification in which the threads are cut or rolled into the metal instead of being rolled, as heretofore described. This can sometimes be done when the metal is of sufficient thickness. It will be observed that I produce the taper in the manner previously described by forcing the metal outward at the base or larger end of the taper, the latter being formed entirely by properly shaping the wall of the tube and not by changing the depth of the threads. That is, I maintain the metal wall of a uniform thickness and the threads a uniform depth throughout the length of the tapered portion, thereby maintaining a uniform strength of metal throughout the joint.

The advantages which result from the reinforced joint constituting my present invention will be apparent to engineers. I eliminate the usual coupling member and form a joint having a strength equal at least to that of the wall of the casing. In addition to the reinforcement of the threaded portion, I provide a reinforced clamping portion by which the casing or pipe sections may be manipulated without injury, this reinforcement extending along the pipe to any desired distance.

I have described in detail the specific constructions illustrated in the accompanying drawings for the purpose of clearly disclosing embodiments of my invention but I am aware that various changes and modifications may be made within the scope of my broad claims and without in any manner departing from the scope of my claims.

I claim:—

1. A sheet metal casing for culverts, conduits, wells and drainage purposes, comprising a tubular member provided with threaded end portions, one end being tapered and the other end being correspondingly flared so that the tapered end of one section may be screwed into the flared end of an adjacent section with an increasing wedging effect, and said ends being reinforced throughout the tapered and flared portions, the reinforcement being extended also back of the threaded portions to provide a plain unthreaded reinforced portion, said plain reinforced portion being of a width sufficient to be grasped and manipulated by the gripping members of a well-drilling machine.

2. A sheet metal casing for conduits, culverts, wells and drainage purposes, comprising a tubular member provided with spirally corrugated end portions, one end being tapered and the other end being reinforced, the corrugations extending into the reinforcement, so that the tapered end of one section may be screwed into the reinforced end of an adjacent section, the diameter of the casing at the base of the tapered portion being enlarged so that the outer end of the tapered portion may have the same internal diameter as that of the main part of the casing.

3. A sheet metal casing for conduits, culverts, wells and drainage purposes, comprising a tubular member provided with threaded end portions, one end being tapered and the other end being reinforced, so that the tapered end of one section may be screwed into the reinforced end of an adjacent section, the diameter of the casing at the base of the tapered portion being enlarged so that the outer end of the tapered portion may have the same internal diameter as that of the main part of the casing.

In testimony whereof I affix my signature.

ANDREW SMITH.

Witness:

BENNETT S. JONES.

Copies of this patent may be obtained for five cents each, by addressing the "Commissioner of Patents, Washington, D. C."